(12) United States Patent
Browne et al.

(10) Patent No.: US 7,997,632 B2
(45) Date of Patent: *Aug. 16, 2011

(54) ON DEMAND MORPHABLE AUTOMOTIVE BODY MOLDINGS AND SURFACES

(75) Inventors: Alan L. Browne, Grosse Pointe, MI (US); Nancy L. Johnson, Northville, MI (US); Ivan G. Sears, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

This patent is subject to a terminal disclaimer.

(21) Appl. No.: 11/759,308

(22) Filed: Jun. 7, 2007

(65) Prior Publication Data

US 2010/0019541 A1    Jan. 28, 2010

Related U.S. Application Data

(60) Division of application No. 11/357,919, filed on Feb. 17, 2006, now Pat. No. 7,252,313, and a continuation-in-part of application No. 11/075,837, filed on Mar. 9, 2005, now abandoned.

(60) Provisional application No. 60/654,312, filed on Feb. 19, 2005, provisional application No. 60/552,677, filed on Mar. 12, 2004.

(51) Int. Cl.
*B60R 19/42* (2006.01)

(52) U.S. Cl. ..................................................... 293/128

(58) Field of Classification Search .................. 296/204, 296/187.04; 293/128, 107; 428/31; 269/224
See application file for complete search history.

(56) References Cited

U.S. PATENT DOCUMENTS

| | | | | |
|---|---|---|---|---|
| 4,010,297 A * | 3/1977 | Wenrick | ........................ | 293/128 |
| 5,399,394 A * | 3/1995 | Zoller | ........................... | 293/128 |
| 5,536,540 A | 7/1996 | Borys et al. | ..................... | 428/31 |
| 6,390,878 B1 * | 5/2002 | Zhou et al. | ....................... | 446/14 |
| 6,833,656 B2 * | 12/2004 | Hooley et al. | .................. | 310/369 |
| 2004/0022997 A1 | 2/2004 | Dujardin et al. | ................. | 428/99 |
| 2004/0195815 A1 * | 10/2004 | Browne et al. | ................ | 280/753 |
| 2005/0017141 A1 | 1/2005 | Glickman | ................. | 248/220.41 |
| 2005/0198907 A1 * | 9/2005 | McKnight et al. | ............ | 49/475.1 |
| 2005/0199055 A1 * | 9/2005 | Browne | ..................... | 73/170.12 |
| 2005/0199440 A1 * | 9/2005 | Keefe et al. | ..................... | 181/284 |
| 2005/0199845 A1 * | 9/2005 | Jones et al. | ............... | 251/129.06 |
| 2005/0230546 A1 * | 10/2005 | Mc Knight et al. | ............ | 244/124 |
| 2006/0125291 A1 * | 6/2006 | Buravalla et al. | ............. | 296/204 |
| 2006/0157908 A1 * | 7/2006 | Verbrugge et al. | ............ | 269/224 |
| 2006/0186706 A1 * | 8/2006 | Browne et al. | ........... | 296/203.01 |
| 2006/0202492 A1 * | 9/2006 | Barvosa-Carter et al. | ..... | 293/107 |
| 2006/0202512 A1 * | 9/2006 | Brei et al. | ................. | 296/187.04 |
| 2006/0267376 A1 * | 11/2006 | McKnight et al. | ......... | 296/180.5 |
| 2007/0063540 A1 * | 3/2007 | Browne et al. | ................ | 296/180 |

FOREIGN PATENT DOCUMENTS

| | | |
|---|---|---|
| DE | 19847385 C1 | 4/2000 |
| WO | 2005089157 A2 | 9/2005 |
| WO | 2005089189 A2 | 9/2005 |

* cited by examiner

*Primary Examiner* — Kiran B. Patel

(57) ABSTRACT

A morphable vehicle member utilizing at least one active material to change at least one attribute in response to an activation signal. The change in at least one attribute is a change in a shape dimension, a shape orientation, an expansion, a contraction, a morphing, a yield strength property, a flexural modulus or a combination. Preferably, the change in at least one attribute in the morphable vehicle member is reversible. Also disclosed herein are methods for the morphable vehicle member utilizing at least one active material to change at least one attribute on demand in response to an activation signal.

4 Claims, 4 Drawing Sheets

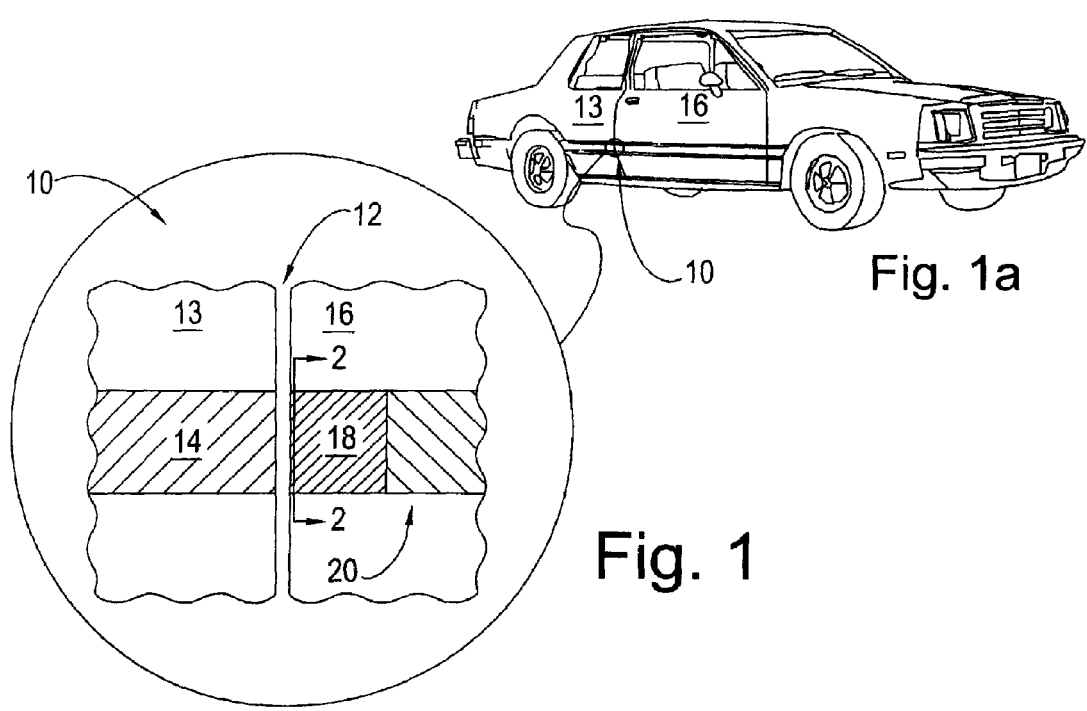
Fig. 1a
Fig. 1
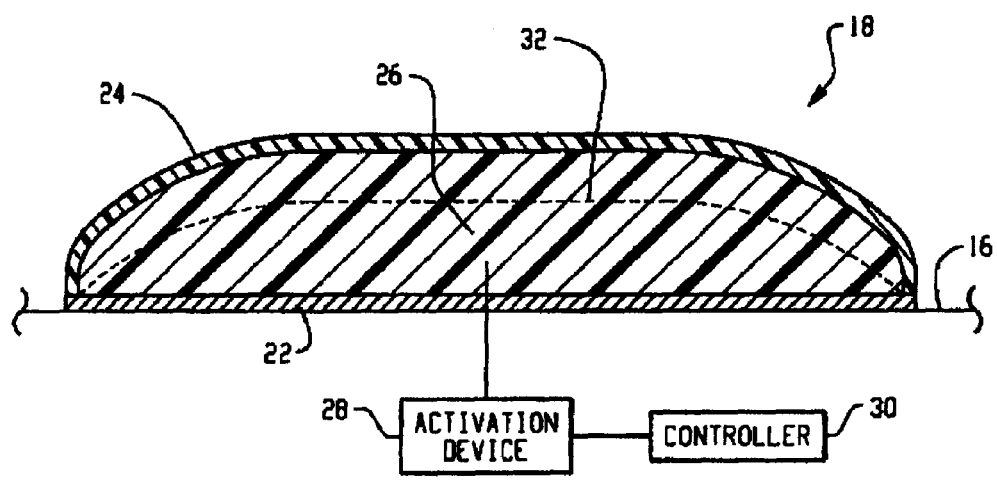
Fig. 2

ON DEMAND MORPHABLE AUTOMOTIVE BODY MOLDINGS AND SURFACES

CROSS REFERENCE TO RELATED APPLICATIONS

The present application is a Division of U.S. application Ser. No. 11/357,919 filed Feb. 17, 2006, which claims the benefit of U.S. Provisional Application No. 60/654,312 filed on Feb. 19, 2005, and claims priority to and is a Continuation-in-Part Application of U.S. patent application Ser. No. 11/075,837 filed on Mar. 9, 2005, which claims the benefit of U.S. Provisional Application 60/552,677, filed on Mar. 12, 2004, all of which are incorporated herein by reference in their entirety.

BACKGROUND

The present disclosure generally relates to on demand morphable body moldings and surfaces, and more particularly, to on demand morphable body moldings and surfaces based on active materials.

Current vehicle members such as body side moldings, rub strips, edge guards and bumpers of various sorts have been employed for years. These types of vehicle members have both decorative and protective functions. For example, edge guards protect the edge of a door, a bumper, or the like and can be made to decoratively accent the vehicle surface. Body side moldings generally are formed of numerous pieces horizontally aligned and attached on the side of a vehicle. Body side moldings must take into account the clearances associated with the opening and closure of door assemblies in vehicles. As a result, some vehicles require a portion of the molding to be cut-away to permit opening and closure of the door. The problem with having to form the molding in this manner is that it decreases the aesthetic qualities of the molding. From a distance, one has difficulty in distinguishing whether the cutaway portion represents damage to the vehicle or is part of the design.

Current vehicle members of the type described above are generally static. That is, these vehicle members are either present on the vehicle or not. For example, mounting a license bracket on the front of the vehicle member is not always needed in the intended vehicle market. There are many jurisdictions that do not require front license plates, whereas others do. However, in view of costs, manufacturers will generally produce all of its vehicle models with a license bracket. This presents an aesthetic problem when the jurisdiction does not require a front license plate and/or an owner does not want a front license plate.

Accordingly, there is a need in the art for on-demand morphable body moldings and surfaces that provide a means for protecting the vehicle and are aesthetically pleasing. It would be particularly advantageous if the vehicle member can reversibly morph on demand.

BRIEF SUMMARY

Disclosed herein are morphable vehicle members and methods of use. In one embodiment, a non-active material based portion coupled to an active material based portion, wherein the active material based portion comprises an active material adapted to change at least one attribute in response to an activation signal, wherein the change in the at least one attribute changes a modulus property, a shape orientation, or a combination of the modulus property change and the shape orientation change to the active material base portion; an activation device in operative communication with the active material adapted to provide the activation signal; and a controller in operative communication with the activation device.

In another embodiment, at least a two part morphable molding for a vehicle contiguously spanning an interface of a door and a doorframe, the morphable molding comprising a first molding attached to the doorframe surface; a second molding attached to the door comprising an active material based portion contiguous to the first molding, the active material based portion comprising an active material adapted to change at least one attribute in response to an activation signal, wherein the change in the at least one attribute changes a modulus property, a shape orientation, or a combination of the modulus property change and the shape orientation change to the active material base portion to provide door clearance upon opening the door an activation device in operative communication with the active material adapted to provide the activation signal; and a controller in operative communication with the activation device.

In one embodiment, a method for selectively forming or erasing a raised pattern in a vehicle surface comprises forming a pattern comprising a active material in the vehicle surface, wherein the active material has a selected one of a trained shape that projects from a surrounding vehicle surface and a trained shape that is substantially aligned with a contour of the surrounding surface; activating the active material, wherein activating the active material changes the selected one of the trained shape that projects to the substantially align with the contour of the surrounding surface and the trained shape that is substantially aligned to project from the contour of the surrounding vehicle surface; and deactivating the active material.

The above described and other features are exemplified by the following figures and detailed description.

BRIEF DESCRIPTION OF THE DRAWINGS

Referring now to the figures, which are exemplary embodiments and wherein like elements are numbered alike:

FIGS. 1 and 1a respectively present a schematic representation of a cross section of a body side molding prior to activation, and a perspective view of a vehicle having a body side molding, in accordance with one embodiment of the disclosure;

FIG. 2 is the schematic representation of the cross section of body side molding taken along lines 2-2 of FIG. 1 upon activation of the at least one active material in accordance with one embodiment of the disclosure;

DETAILED DESCRIPTION

Figure 3:
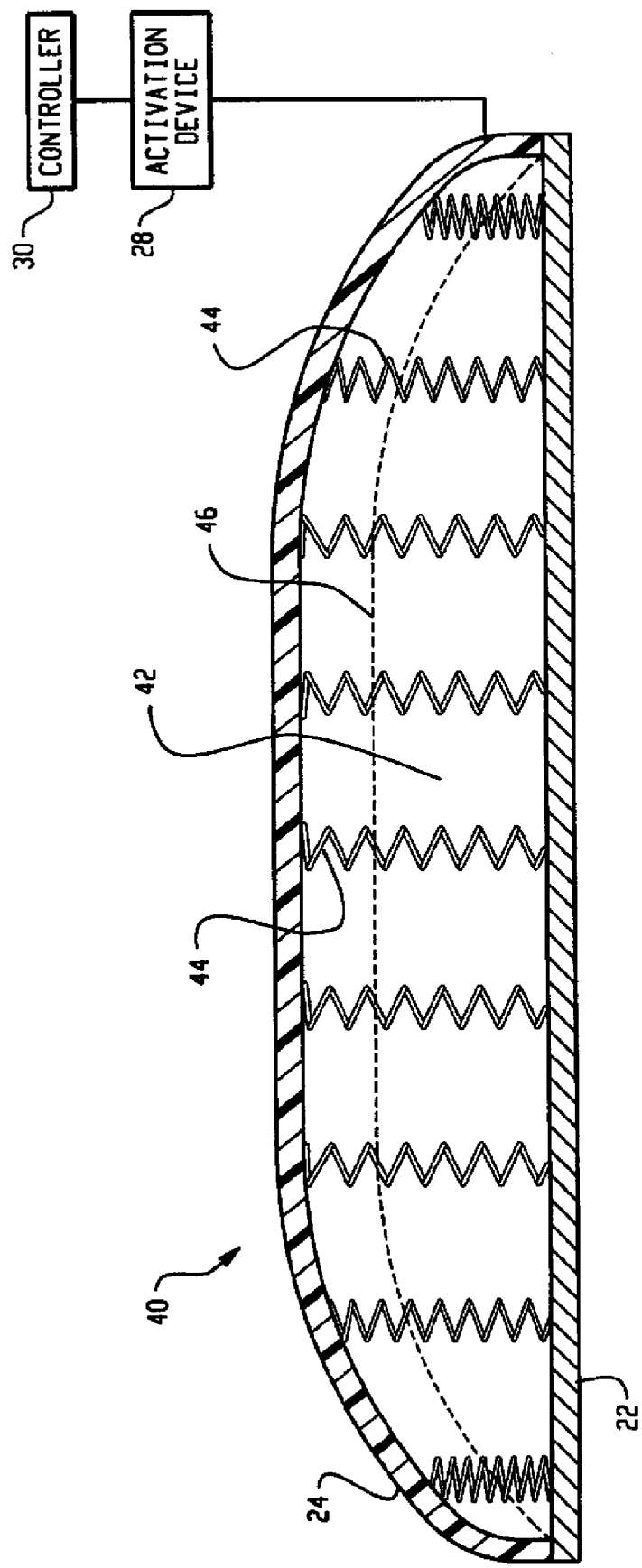
FIG. 3 is a schematic representation of a cross section of springs in a morphable vehicle member prior to activation in accordance with one embodiment of the disclosure.

The present disclosure generally relates to morphable vehicle members and methods of use in a vehicle, and in particular, to morphable vehicle members comprising an active material that changes the shape orientation and/or modulus properties of the vehicle member in response to an activation signal. Upon deactivation, the morphable vehicle member can recover its original configuration. In some embodiments, the active materials can be employed as actuators disposed within the morphable vehicle member to effect the change in shape orientation and/or modulus properties. Although reference will made herein to automotive applications, it is contemplated that the morphable vehicle members can be adapted to form various surfaces, wherein on demand morphable surfaces are desired such as may be desired for airplanes, trains, buses, trucks, vans, recreational vehicles and the like.

As used herein, the term "vehicle member" refers to various parts that form the vehicle, which include, but are not intended to be limited to, body side moldings, rub strips, edge guards, bumpers, fenders, front end structures, license plate brackets, trunk panels, hood panels, body panels, door panels, and the like. It also refers to interior surfaces of the vehicle which include, but are not limited to, the dashboard, the sun visor, the center console, the armrest, the seat, the headrest, the door surface, and the like. Other suitable parts or components of the vehicle will be apparent to those skilled in the art in view of this disclosure.

The morphable vehicle member generally comprises an active material adapted to change shape orientation in response to an activation signal. The term "active material" as used herein refers to several different classes of materials all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAP), magnetorheological fluids and elastomers (MR), electrorheological fluids (ER), electrostrictive polymers, ionic polymer gels, composites of one or more of the foregoing materials with non-active materials, combinations comprising at least one of the foregoing materials, and the like. The active material may be integrated within a member of the vehicle or may define the complete member. Moreover, selective morphing can be effected by means of flexural modulus changes, shape changes, rotations, reorientation, and the like. Of the above noted materials, SMA- and SMP-based vehicle member assemblies may further include a return mechanism in some embodiments to restore the original geometry of the assembly. The return mechanism can be mechanical, pneumatic, hydraulic, or based on one of the aforementioned active materials.

By utilizing the active material, the morphable vehicle member can reversibly change at least one attribute to provide protection on demand, provide enhanced appearance of the vehicle member, as well as provide 'disappearing' mounts, where desired and configured. In addition, the active material can be configured to function as an actuator to effect the change in shape orientation and/or modulus properties, i.e., effect morphing. Applying an activation signal to the active material can effect the reversible change on demand. Suitable activation signals will depend on the particular active material used. As previously discussed, the activation signal provided for changing the shape orientation of the vehicle member may include a mechanical loading or stressing, a thermal signal, an electrical signal, a magnetic signal and combinations comprising at least one of the foregoing signals, and the like.

Referring now to FIGS. 1-2, there is shown an exemplary morphable vehicle member 10 suitable for use as body side molding (FIG. 1a) spanning an interface 12 between a body surface (i.e., "body") 13 and a door surface (i.e., "door") 16. The vehicle member 10 has an active material portion 18, which is shown attached to a conventional body side molding portion 20 of the door surface 16. The body side molding 10 spans across the interface 12 and is linearly aligned with a molding portion 14 disposed on the body surface 13. As shown more clearly in FIG. 2, the active material portion 18 generally includes a rigid base 22 and a flexible covering 24 attached thereto with respect to the base 22. The vehicle member 10 including the active material portion 18 can be fastened to a body surface of a vehicle (e.g., door surface 16) by fasteners or adhesives such as double-sided adhesive tape, acrylic foam tape, and the like. The active material portion 18 comprises an active material 26 adapted to change a shape orientation and/or modulus properties in response to an activation signal. The active material can take many forms as previously discussed. For example, the active material can be in the form of a solid body of shape memory polymer such that activation causes a modulus change. In other examples, the active material can take the form of shape memory alloy springs intermediate the flexible covering. Still further, the space intermediate the flexible covering and base can be filled with an electrorheological or magnetorheological fluid. Other variations are contemplated and well within the skill of those in the art.

The active material 26 is in operative communication with an activation device 28 and a controller 30. The activation device 28 provides the appropriate activation signal to the active material 26 based on signals provided by the controller 30. By way of example, the vehicle member 10 may form a body side molding that provides a substantially continuous surface across interfaces such as those provided by interface 12. Upon selective activation of the active material portion 18, e.g., a shape memory polymer, the shape orientation and/or modulus properties of the active material portion 18 change so as to provide the desired amount of clearance between the door surface 16 and door frame surface 14 to permit door opening (as shown by the dotted line structure 32 in FIG. 2). Although the vehicle member 10 is illustrated as having a hollow interior region defined by the flexible covering 24 and the rigid base 22, it is contemplated that the flexible covering 24 and rigid base could form a solid structure, i.e., no hollow interior region. Moreover, the entire vehicle member 10 (e.g., body molding) can be formed of the active material or selected portions thereof as shown.

Optionally, the active material can passively morph the vehicle member 10 without an applied activation signal from the controller. For example, the active material 26 can be selected to be undergo a change in shape orientation and modulus properties upon a mechanical stress, e.g., a pressure loading, such as may be caused by opening the door to allow one to enter and to exit. This, for example, is the case for SMA when in its austenitic phase, i.e., an example of superelasticity. Upon opening the door, a portion of the vehicle member 10 contacts the active material portion 18 causing it to plastically deform. When the door is not opened, the active material 26 is unloaded and thus deactivated and the shape and modulus properties of the vehicle member 10 revert to its original shape and modulus properties in the absence of the load, which can be used to provide the continuous surface across various interfaces such as the door and doorframe so as to maintain a pleasing aesthetic appearance to the vehicle.

As another example, the morphable vehicle member can be configured for use as a rub strip formed of the active material, e.g., a shape memory polymer. An activation signal in response to the anticipation of a door opening, such as movement of door handle, pressing of remote key fob and the like can be used to trigger thermal activation of the shape memory polymer to effect a change in its modulus allowing deformation to occur in the rub strip upon door opening. The shape memory polymer would remain heated until the door was closed or be reheated upon door closing. The heated shape memory polymer rub strip after the door is closed is no longer under a load and would revert back to its original configuration. In this manner, opening and closing of the door can be programmed with minimal effort or resistance as contributed by forces associated with the rub strip.

Referring now to FIG. 3, there is shown a cross sectional view of morphable vehicle member 40. The vehicle member 40 comprises the rigid base 22 and flexible covering 24 that cooperatively define a hollow interior region 42. A plurality of wires 44 is disposed within the interior region 42 having one end attached to the rigid base 22 and the other end attached to an underside of the flexible covering 24. The wires 44 can take any form including but not limited to strips, bands, springs, and the like. The plurality of wires 44 is formed of the active material and is in operative communication with the activation device 28 and controller 30, which provides the activation signal to the active material. Activation of the active material effects a change in shape orientation and/or modulus properties such that the shape changes to the dotted line structure 46 as shown or elastic compression can occur upon application of a load, e.g., contact of the active material portion with a door frame surface.

By way of example, the wires 44 can be formed of a shape memory alloy. Applying an activation signal to the shape memory alloy wires 44 cause the shape memory alloy to contract to the second shape orientation as evidenced by the dotted line structure. The location of the shape memory alloy wires 44 can vary depending on intended amount of morphing within the vehicle member 40 as well as the desired application, all of which is well within the skill of those in the art in view of this disclosure As previously described, the controller 30 can be programmed to deliver the activation signal upon an event such as a door opening and discontinuing the activation signal upon door closing. Alternatively, the activation signal may be initiated by electronic key fob, pressing or activating the power unlock buttons indicating one is entering or exiting the vehicle, and the like. Upon receiving the activation signal, the shape memory alloy wires 44 contract causing the flexible covering 24 to flex inward.

In another embodiment, the active material wires can be utilized to expand causing desired displacement as would be apparent to those skilled in the art in view of this disclosure. Moreover, the desired displacement can also be obtained with the use of other active materials such as electroactive polymers, piezoelectric elastomers, active material fluids that selectively expand or contract, and the like.

Aside from strict shape recovery, any active material that can be made to linearly expand or contract may be used to produce a bending actuator by combining the active material with a non-active elastic member. In the literature, this is generally referred to as a unimorph actuator. If both components are made of the same material but made to deform in opposite directions, the material becomes a bimorph. For on demand applications such as those described above, some active materials may be appropriate themselves for the outer surface of the morphable vehicle member.

Using an active material that expands or contracts can induce bending to the left or right. In the bimorph configuration, either direction can also be achieved depending on orientation of the active material layers. An unimorph may be created by using a shape memory alloy, conducting polymer, electrostrictive polymer, or other axially straining material, along with an elastic component that causes a bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the at least one active material, have properties that are acceptable in the working temperature range, and have adequate toughness to survive repeated actuation. A bimorph may be created for any material in which the material may be driven into both extension and compression depending on the driving signal. Piezoelectric materials can be used for this effect. Ionic polymer actuators such as ionic polymer metal composites and conducting polymers intrinsically exhibit this effect due to the transport of ionic species that cause swelling across a membrane. Therefore, these materials are preferably used for this type of deformation.

Figure 4:
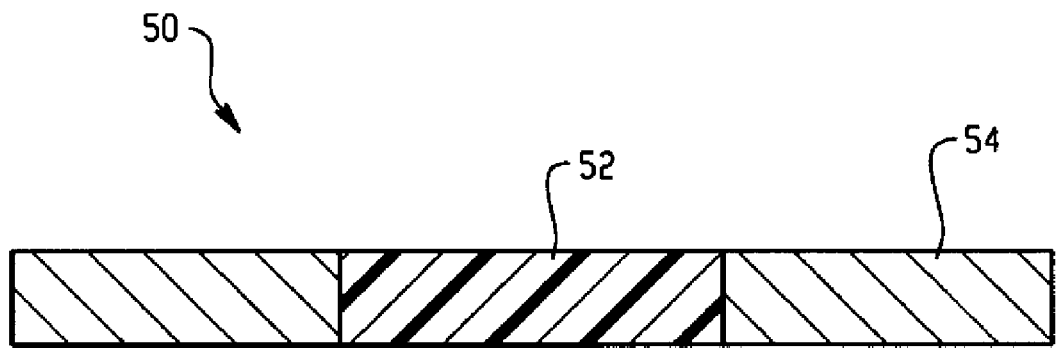
FIG. 4 is a schematic representation of a cross section of a morphable vehicle member prior to activation in accordance with one embodiment of the disclosure.
Figure 5:
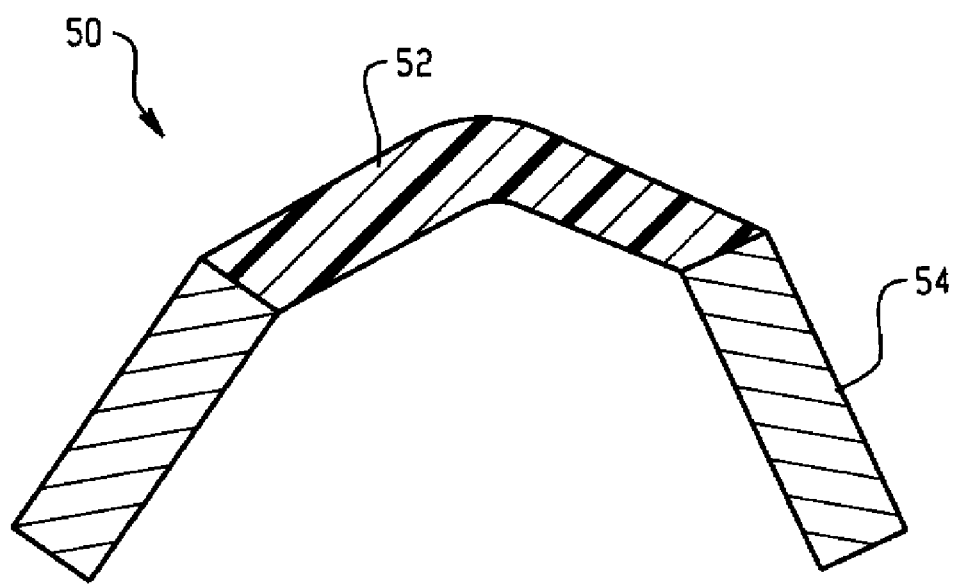
FIG. 5 is the schematic representation of the cross section of the morphable vehicle member in FIG. 5 upon activation of the at least one active material in accordance with one embodiment of the disclosure.

Referring now to FIGS. 4 and 5, there is shown an exemplary morphable vehicle member 50 configured for use as an edge guard. Edge guards are generally employed to protect the vehicle from dents, dings and scratches when doors are opened and bumped against neighboring vehicles. For example, the edge guard 50 may be configured to protect the vehicle door, trunk door, bumper, and the like during normal operation of the vehicle.

The vehicle member 50 in accordance with embodiment comprises localized regions 52 of active material in operative communication with regions 54 of a non-active material 54. In FIG. 4, the vehicle member 50 is shown in an initial substantially straight configuration. FIG. 5 illustrates the vehicle member 50 in a second shape orientation in the activated state, wherein the edge guard assumes a curvilinear shape. In this manner, the edge guard can be selectively activated to assume the curvilinear shape so as to protect the other vehicle surfaces from being contacted. When deactivated, the edge guard is restored to its original shape, which in some applications can be coplanar with the surrounding surface contour.

In operation, applying an activation signal to the regions 52 causes the active material to deform to the second shape orientation. The deformation causes the active material to buckle along a predefined path absorbing kinetic energy associated with any minor impact event. In the event the non-active material is fixedly attached to a surface, the localized region 52 would bow out or in depending on the intended application. As such, the location of the active material will vary depending on the dimensional axes and the desired application. In this manner, impact of an object can cause the vehicle member 10 to buckle along the predefined path. For example, the edge guard can be strategically positioned on the vehicle to provide protection against a shopping cart impact.

Alternatively, the morphable vehicle member 50 is formed entirely of the active material, which changes at least one attribute upon an activation signal. The morphable vehicle member may be in an initial straight configuration and bend into a curved position upon activation signal. For example, the door edge guard wraps around the edge of the door protecting it on demand. The amount of curvature would depend on the intended application.

In other embodiments, the morphable rub strips can be configured to provide active damping by expanding outward in response to the activation signal. For example, dielectric elastomers can be used as the morphable rub strip. For example, a sealed tube of the dielectric elastomer is fabricated with a defined internal pressure and applied to the desired locations at about the vehicle edge. As voltage is applied, the tube expands in diameter in an amount effective to provide effective protection against dings. In another example, rub strips are formed of shape memory polymer, which can be heated and thus softened upon door opening to minimize any impact damage upon striking a neighboring object such as side of a vehicle. After closing of the door, the shape memory polymer can return to its original undeformed geometry and upon discontinuation of activation, the shape memory polymer can stiffen upon cooling.

Figure 6:
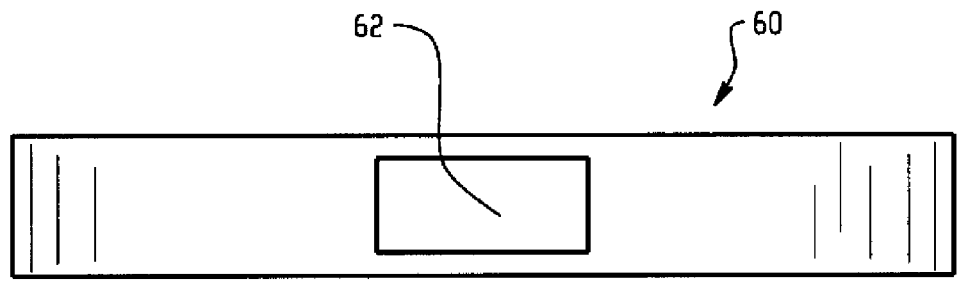
FIG. 6 is a schematic representation of a cross section of a morphable vehicle member prior to activation in accordance with one embodiment of the disclosure.
Figure 7:
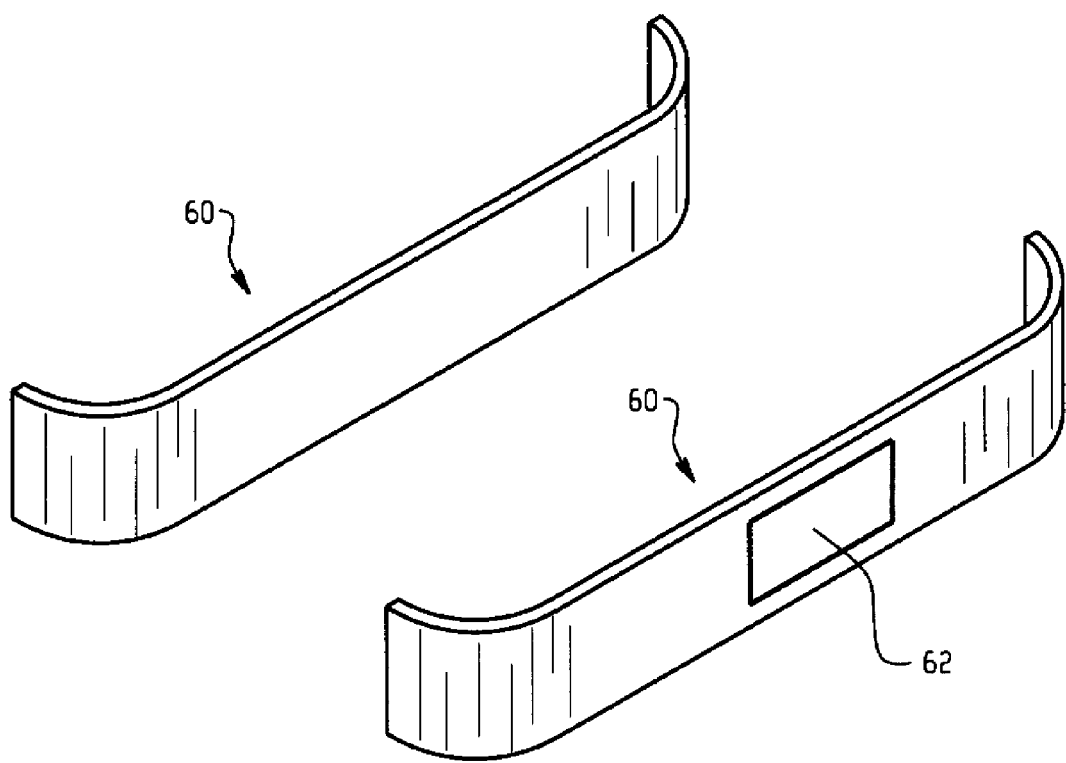
FIG. 7 is the schematic representation of the cross section of the morphable vehicle member in FIG. 7 upon activation of the at least one active material in accordance with one embodiment of the disclosure.

Referring now to FIGS. 6 and 7, there is shown a vehicle bumper 60 employing a morphable vehicle member 62 to define a license plate bracket. Vehicle member 62 is defined by a pattern formed of the active material. Alternatively, the entire front bumper may be formed of the active material with portions corresponding to the license bracket selectively activated, although this is generally less preferred in view of the material and processing costs associated with the active materials.

As shown more clearly in FIG. 7, applying an activation signal to the active material in the bumper causes the license plate bracket to appear or disappear depending on the configuration of and type of active material used. For example, in the case of shape memory polymers, a thermal activation signal can be applied or a load can be applied to plastically deform a preformed license bracket portion (i.e., the preformed license bracket includes projections emanating from the major planar surfaces that generally define the bumper) and make it uniformly aligned with the remaining contour surface of the front bumper. Subsequently cooling the license bracket portion will lock the plastic deformation in place and cause the "disappearance" of the bracket. If the surface contour associated with the license plate bracket is desired, then reheating the license bracket region in the absence of a load will return the license bracket portion to its original shape orientation. Depending on the type of active material utilized, the molding formed of the active material can be made to appear or disappear upon activation.

In another embodiment, regions of SMP can be located in various exterior and interior surfaces of the vehicle. A thermal activation through the use of heated tools shaped in a pattern that is desired can be used to create personalized and/or distinctive bas-relief engravings and displays. If one no longer desires these engravings and displays, heating the shape memory polymer surface with surface loads removed will "erase" them. Suitable interior and exterior surfaces include, but are not limited to, a vehicle bumper, an interior surface, a steering wheel surface, a seat surface, a dashboard surface, a console surface, and the like.

In another embodiment, localized regions of shape memory polymer can be located in exterior regions of the vehicle that are subject to dings, dents and scratches. To remove these plastic deformations, one would apply thermal activation in the absence of a load to heal and/or repair the surface regions made of shape memory polymer. Of course, the repair would be limited to damage associated with plastic deformation of the surface as opposed to abrasions, tears, avulsions, breaks and the like.

Optionally, the pattern of the active material has a thickness and/or is semi-opaque or translucent such that the pattern can be backlit. For example, a lighting panel can be disposed behind the pattern to provide the backlight. Alternatively, a reflective or bright panel can be employed, e.g., a chrome panel. In this manner, the pattern can be readily visible and aesthetically interesting. Still further, the pattern can be textured.

In other examples, the morphable vehicle member is a trunk, a hood, a spoiler, a dashboard, a sun visor, a center console, an armrest, seat, headrest and the like. The morphable vehicle member has localized regions of the at least one active material. For example, the dashboard is formed of a shape memory polymer material which can be used to create personalized/distinctive bas-relief engravings and displays with heated tools. Subsequently, if one desires to remove the engravings and/or displays, the localized regions of SMP can be reheated with surface loads removed, thus "erasing" the displays and/or engravings.

In another example, the morphable vehicle member is a front spoiler, fender, bumper and the like. These areas typically receive nicks, dents, scratches or damage at low speeds due to its location close to the ground. For example, the front spoiler on a sports vehicle has at least one active material. The driver can plastically deform the front spoiler with rocks. Upon reheating the at least one active material in the front spoiler with surface loads removed, the plastic deformation can be repaired in the front spoiler. Alternatively, this can be applied for fenders, bumpers and the like.

Desirably, the change in at least one attribute of the active material remains for the duration of the applied activation signal. Also desirably, upon discontinuation of the activation signal, the change in the at least one attribute reverts substantially to its original form prior to the activation. In this manner, reversibility can advantageously occur.

Shape memory polymers (SMPs) generally refer to a group of polymeric materials that demonstrate the ability to return to some previously defined shape when subjected to an appropriate thermal stimulus. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SNPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SNIP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the panel conform to a given surface as may be desired for different applications. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials for use in the panel include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends on the temperature range where the component will operate.

Aside from strict shape recovery, any active material that can be made to linearly expand or contract may be used to produce a bending actuator by combining this active material with a non-active elastic member. In the literature, this is generally referred to as a unimorph actuator. If both components are made of the same material but made to deform in opposite directions, the material becomes a bimorph. For on demand applications, some materials may be appropriate themselves for the outer surface of the vehicle control mechanism.

Using the at least one active material that expands or contracts can induce bending to the left or right, respectively. In the bimorph either direction can also be achieved depending on orientation of the at least one active material layers. An unimorph may be created by using a shape memory alloy, conducting polymer, electrostrictive polymer, or other axially straining material, along with an elastic component that causes bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the at least one active material, have properties that are acceptable in the working temperature range, and have adequate toughness to survive repeated actuation. A bimorph may be created for any material in which the material may be driven into both extension and compression depending on the driving signal. Ionic polymer actuators such as IPMC and conducting polymers intrinsically exhibit this effect due to the transport of ionic species that cause swelling across a membrane. Therefore, these materials are preferably used for this type of deformation.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer or rubber (or combination thereof) that deforms in response to an electrostatic force or whose deformation results in a change in electric field. Exemplary materials suitable for use as a prestrained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinyl amine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, more preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

The various examples provided herein are merely exemplary and are not intended to be limiting. Other examples may include morphable vehicle members such as car seat, door panel, back spoiler, hood, mudguards, and the like. The morphable vehicle member advantageously provides protection, repair and engraving/display options on a vehicle.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. At least a two part morphable molding for a vehicle contiguously spanning an interface between a door surface and a doorframe surface, when in the closed condition, the morphable molding comprising:
   a first molding attached to the doorframe surface;
   a second molding attached to the door surface comprising an active material based portion contiguous to the first molding, the active material based portion comprising an active material adapted to change at least one attribute in response to an activation signal, wherein the change in the at least one attribute changes a modulus property, a shape orientation, or a combination of the modulus property change and the shape orientation change to the active material base portion to provide door clearance upon opening the door surface;
   an activation device in operative communication with the active material adapted to provide the activation signal; and
   a controller in operative communication with the activation device.

2. The morphable vehicle member of claim 1, wherein the at least one active material comprises a shape memory polymer, a shape memory alloy, a magnetic shape memory alloy, an electroactive polymer, a magnetorheological elastomer, a magnetorheological fluid, an electrorheological fluid, electrorheological elastomer, an ionic polymer metal composite, a piezoelectric, or a combination comprising at least one of the foregoing active materials.

3. The morphable vehicle member of claim 1, wherein the activation signal is a selected one of a thermal signal, an electrical signal, a magnetic signal, a mechanical signal, a chemical signal, and a combination comprising at least one of the foregoing signals.

4. The morphable vehicle member of claim 1, wherein the active material based portion further comprises a flexible covering, a rigid base, and the active material is intermediate the flexible covering and the base.

* * * * *